Patented Mar. 21, 1944

2,344,831

UNITED STATES PATENT OFFICE 2,344,831

TERPENE DERIVATIVE

Emil Ott, Wilmington, Del., assignor to Hercules Powder Company, Wilmington, Del., a corporation of Delaware No Drawing. Application August 22, 1941,
Serial No. 407,949

12 Claims. (Cl. 260—429)

This invention relates to new compositions of matter and methods of producing the same; and more particularly it relates to a group of organic salts which are especially useful in protective coatings.

In accordance with this invention it has been found that desirable metal salts having interesting and useful characteristics may be prepared by reacting a condensation product of an acyclic terpene having three double bonds per molecule and maleic anhydride or its equivalents disclosed hereinafter, with a polyvalent metal compound. Suitable metal compounds comprise the oxides, hydroxides and salts of the polyvalent metals, as for example, zinc, lead, manganese, iron, cobalt, calcium, cadmium, cerium, copper, nickel, vanadium, etc. In place of the aforesaid condensation product of an acyclic terpene having three double bonds per molecule and maleic anhydride or its equivalents, there may be employed the condensation product of a polymer of an acyclic terpene having three double bonds per molecule and maleic anhydride or its equivalents. The invention in its broadest scope also comprehends the partial esterification of any of the aforesaid condensates and the preparation of polyvalent metal salts from the partially esterified condensates. Certain of the resulting products have properties which make them particularly useful as driers and as resins in protective coating compositions.

Any acyclic terpene having three double bonds per molecule, as for example, allo-ocimene, ocimene, myrcene, etc., may be employed in preparing a condensation product with maleic anhydride or its equivalents. It is preferred to employ allo-ocimene since this compound, in addition to having three double bonds per molecule, has them in a triply conjugated system. Hereinafter, an acyclic terpene having three double bonds per molecule will be referred to for convenience merely as an acyclic terpene.

Equivalently for the maleic anhydride employed in preparing the condensate, there may be employed maleic acid or its isomer fumaric acid. In addition, other unsaturated acids or acid anhydrides, such as, citraconic, aconitic, itaconic, acrylic, methacrylic, α-crotonic, and β-crotonic acids or anhydrides may be employed. In fact, any unsaturated organic acid or acid anhydride having a point of unsaturation between the alpha- and beta-carbon atoms, which acid or acid anhydride contains no more than 6 carbon atoms may be employed. These unsaturated organic acids or acid anhydrides are characterized by their comprising the

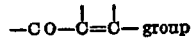

Since maleic anhydride is the preferred reactant to employ in the formation of the condensate it will be used hereinafter for purposes of illustration.

In the actual preparation of the condensate, the reactants are intimately mixed and heated to a temperature of preferably from about 40° C. to about 60° C. Desirably, the heating is carried out using an air condenser. Inasmuch as equimolar proportions of the acyclic terpene and maleic anhydride or maleic acid react, it is preferred to employ such proportions. However, other proportions may be used. The reaction is at first quite vigorous. Thereafter, the mixture may be further heated at a temperature of, for example, 190° C. and for a period of, for example, ½ hour or more. The unreacted materials may be removed by reduced pressure distillation; also, if desired, the product itself may be vacuum distilled for purification. Further purification of the product may be had by recrystallization from a suitable solvent, such as, petroleum ether, gasoline, benzene, etc.

In the particular instance where allo-ocimene is the acyclic terpene employed, the maleic anhydride condensate has the form of prismatic needles and has the following average characteristics:

Melting point (capillary tube) _____°C__ 80–82
Acid number (in pyridine) _____ 463–470

The condensation product of a monomeric acyclic terpene and maleic anhydride or maleic acid may also be prepared by reacting maleic anhydride or its equivalents with a mixture of terpenes containing a substantial quantity of one of the acyclic terpenes hereinbefore mentioned. Such an acyclic terpene containing terpene mixture, for example, is formed when α-pinene is pyrolyzed at suitable conditions of temperature and contact time of the α-pinene vapor with the reaction tube. The acyclic terpene formed is allo-ocimene, and it may be present in an amount up to 40% or more. In addition, there will be present other terpenes as dipentene, α-pinene, etc., not having conjugated systems of double bonds. In fact, allo-ocimene is the only constituent present having a conjugated system of double bonds. When such a mixture containing allo-ocimene and unconjugated terpenes is brought into contact with maleic anhydride in quantities sufficient to react with the allo-ocimene present and at a temperature within the range of from about 60° C. to about 100° C., only the allo-ocimene present reacts in substantial amount. This reaction product after removal of unreacted constituents may be reacted with a desired polyvalent metal compound in accordance with the processes of this invention. Likewise, pyrolysis of β-pinene, say at 400° C., yields a mixture of terpenes which may contain as much as 65 to 70% myrcene in addition to small amounts of l-limonene and other complex unidentifiable terpenes. Here again, myrcene is the only terpene present having a conjugated system of double bonds. Hence, when such a mixture is contacted with maleic anhydride in quantities sufficient to react with the myrcene present and at a temperature within the range of 60° C. to 100° C., only the myrcene reacts in substantial amount. The reaction product, after removal of unreacted constituents, may be reacted with a desired metal compound in accordance with the instant invention.

Now, to prepare the condensate of a polymerized acyclic terpene with maleic anhydride or its equivalents, the reactants are intimately mixed and heated at an elevated temperature, preferably between about 180° C. and about 250° C. for from 1 to 8 hours. Preferably, equi-molar proportions of the two materials will be employed. The polymeric acyclic terpene may be obtained from the monomeric form by any of the possible methods such as polymerization with sulfuric acid catalyst, polymerization with phosphoric acid catalyst as disclosed in the co-pending application for United States Letters Patent of A. L. Rummelsburg, Serial No. 396,213, filed May 31, 1941, or polymerization with metal halides as catalyst as disclosed in the co-pending application for United States Letters Patent of A. L. Rummelsburg, Serial No. 396,212, filed May 31, 1941. When polymeric allo-ocimene, for example, is condensed with maleic anhydride, solid, light-colored resins result. These products may be purified by the use of reduced pressure to remove unreacted constituents such as maleic anhydride or polymerized allo-ocimene.

The preferred acyclic terpene polymers to employ in the condensation are the substantially pure dimers. For example, when a liquid polymeric allo-ocimene consisting substantially entirely of the dimer is condensed with maleic anhydride according to the processes described supra, the purified product will be found to have the following average characteristics:

Color (rosin scale) _____ G to I+
Melting point (Hercules drop) _____ 80 to 90
Acid number (in pyridine) _____ 325

When, however, a polymeric form of allo-ocimene is used which contains substantial quantities of polymeric constituents higher than the dimer, and in particular when a solid polymer is used, the resulting condensate with maleic anhydride will have different characteristics depending upon the extent of polymerization of the allo-ocimene used.

In accordance with this invention, any of the aforesaid condensation products will be reacted with a suitable compound of a polyvalent metal. While any polyvalent metal in the form of an appropriate compound may be employed, certain polyvalent metals are of preferred utility inasmuch as the resulting salts prepared from the aforementioned condensates have excellent drying properties when used in oleoresinous protective coatings. These metals comprise cobalt, manganese, cerium, lead, iron, copper, nickel, vanadium, chromium, calcium, aluminum, cadmium, zinc and tin. Hereinafter in this specification and claims these metals will be referred to as "drier metals." Of these drier metals, zinc, lead, cobalt, manganese and iron have shown the best results. Suitable compounds of the polyvalent metals include the oxides, hydroxides, inorganic salts and salts of the metals with organic acids of between 1 and 20 carbon atoms, those having between 2 and 6 carbon atoms being preferred.

Various methods of reacting the condensation product and the polyvalent metal compound may be employed. If the metal salt of the condensation product is insoluble, the precipitate may be recovered by the usual methods; if soluble, it may be recovered by evaporation of the solvent. In the latter instance, a hydroxide of the metal will desirably be employed. Alternatively, the reaction may be carried out by fusing the condensation product and the desired metal oxide, hydroxide or salt, preferably at a temperature within the range of from about 125° C. to about 325° C. Where fusion is employed, it is necessary to employ the condensate in the form of the acid rather than the anhydride. Another procedure for preparing the metal salts of the invention is to first dissolve the condensate in a suitable solvent and then prepare the sodium salt by neutralizing the resulting solution with aqueous sodium hydroxide. The solution is then diluted with a relatively large volume of water. Thereafter, an aqueous solution of the desired metal compound, as for example, lead acetate, is added and the precipitate is recovered as desired.

In accordance with the invention, the condensate may be first partially esterified prior to reacting the same with the desired polyvalent metal compound. This may be accomplished, of course, only with the polybasic condensates such as those formed using maleic anhydride. In the partial esterification, monohydric alcohols as methyl, ethyl, butyl, n-propyl, isopropyl, lauryl, stearyl, bornyl, isobutyl, amyl, fenchyl, etc., alcohols, also polyhydric alcohols as ethylene glycol, propylene glycol, glycerol, pentaerythritol, etc., may be employed.

Several illustrative embodiments are given below to point out the practical adaptations of the invention. All parts and percentages herein are by weight unless otherwise specified.

*Example 1*

A condensation product of monomeric allo-ocimene with maleic anhydride was prepared, having an acid number (pyridine) of 470 and a color of K on the rosin color scale. One hundred parts of such condensate and 300 parts of 95% ethyl alcohol were mixed to form a homogeneous solution. The solution was then neutralized with aqueous 38% sodium hydroxide using phenolphthalein as an indicator. The resultant neutralized solution was dissolved in 3 liters of water. To 200 parts of the resultant aqueous solution were added 125 parts of aqueous 20% lead nitrate with vigorous stirring. A precipitate formed which was removed by filtration, washed with water, and dried in vacuo. A drier solution was made up by dissolving 10 parts of the dried salt in 20 parts of toluene.

*Example 2*

The procedure of Example 1 was duplicated with the exception that the aqueous lead nitrate solution was replaced with an aqueous 20% manganous chloride solution. The resulting precipitate was filtered, washed with water, and dried in vacuo. A drier solution was made up by dissolving 10 parts of the dried salt in 26.3 parts of toluene.

Example 3

The procedure of Example 1 was duplicated only the aqueous lead nitrate solution was replaced with an aqueous 20% cobaltous nitrate. The resulting precipitate was filtered, washed with water, and dried in vacuo. A drier solution was made up by dissolving 10 parts of the dried salt in 22.5 parts of toluene.

Example 4

To determine the utility of the aforesaid drier solutions a synthetic alkyd enamel was prepared. The alkyd resin employed in the synthetic enamel was prepared using the following raw material formula:

| | Parts |
|---|---|
| Terpene-maleic anhydride condensate | 1,568 |
| Linseed oil fatty acids | 1,793 |
| Glycerol | 634 |
| China-wood oil | 413 |

The terpene-maleic anhydride condensate employed was one obtained by condensing a mixture of cyclic terpenes comprising dipentene, terpinolene, α-terpinene and p-cymene with maleic anhydride. The esterification of the above raw materials gave a resin having an acid number of 30 and a cure-time at 200° C. of 7 seconds. The resin was dissolved in a solvent mixture comprising 50% mineral spirits and 50% Solvesso No. 2 to form a 50% solution. Employing this vehicle, a paste was made by grinding 100 parts of CP toluidine toner in 155 parts of the resin solution. One hundred and sixty-two parts of the paste so formed were further reduced with 583 parts of additional resin solution to form an enamel. Sufficient of the lead and cobalt drier solutions was added to the enamel so as to give 0.3% lead as metal and 0.05% cobalt as metal based on the alkyd vehicle solids.

This enamel was coated on a steel panel by spray application. It set to dust in 3 hours and dried firm in 5¼ hours. After aging for one month, the dry test was repeated to give a set to dust time of 2½ hours and a firm dry time of 4¼ hours. This demonstrates the excellent aging qualities of these siccative compositions. Upon standing in containers, this enamel was found to have less skinning tendencies than a comparable enamel containing currently available driers in the same proportion as the allo-ocimene maleate derivatives.

Example 5

Sufficient of the manganese drier solution prepared in accordance with Example 3 was added to 100 parts of alkali refined linseed oil to give 0.1% manganese metal based on the oil. This oil was flow coated on glass to determine the drying rate. It set to dust in 5¾ hours and dried in 6½ hours. This is a particularly fast drying rate for linseed oil.

Example 6

A 40-gallon China-wood oil-linseed oil varnish was prepared by using the following raw material formula:

| | Parts |
|---|---|
| Glycerol ester of N wood rosin | 100 |
| China-wood oil | 195 |
| Heat bodied linseed oil (viscosity Z Gardner-Holdt) | 120 |
| Mineral spirits | 75 |
| Xylol | 340 |

To 300 parts of this varnish sufficient of the aforesaid drier solutions was added to give 0.3% lead, 0.07% manganese and 0.03% cobalt as metal based on the oil. The resulting varnish was applied to glass to give a film 1 mil thick. The film set to dust in 8 hours and dried in 16 hours.

The polyvalent metal salts prepared in accordance with this invention are useful particularly in the protective coating field. The polyvalent drier metal salts are of primary importance in the class. As illustrated, these salts impart excellent drying characteristics to oleoresinous protective coatings. The original drying characteristics of coatings containing these drier salts are highly satisfactory. Furthermore, compositions containing these new driers do not lose their originally good drying characteristics with age. For the above reasons the advent of these drier salts represents the solution of difficult merchandising problems in the paint and varnish industry. As has been shown in the examples, protective coating compositions containing these new drier salts are less objectionable from the standpoint of skinning upon standing in a container than are compositions containing prior art driers. The polyvalent metal salts of this invention other than those which exhibit drier characteristics may themselves be used in protective coatings, not as driers but as film-forming resins. These resins possess thermoplasticity, and in common with the drier metal salts they are substantially completely water-insoluble, making them very useful in the protective coating field.

It will be understood that the details and examples hereinbefore set forth are illustrative only and that the invention as broadly described and claimed is in no way limited thereby.

What I claim and desire to protect by Letters Patent is:

1. A polyvalent metal salt of the condensation product of a material selected from the group consisting of the monomers and dimers of acyclic terpenes having three double bonds per molecule and a material selected from the group consisting of the α-, β-unsaturated organic acids and acid anhydrides, which material contains less than 7 carbon atoms per molecule.

2. A polyvalent drier metal salt of the condensation product of a material selected from the group consisting of the monomers and dimers of acyclic terpenes having three double bonds per molecule and a material selected from the group consisting of the α-, β-unsaturated organic acids and acid anhydrides, which material contains less than 7 carbon atoms per molecule.

3. A polyvalent drier metal salt of the condensation product of a monomeric acyclic terpene having three double bonds per molecule and a material selected from the group consisting of the α-, β-unsaturated organic acids and acid anhydrides, which material contains less than 7 carbon atoms per molecule.

4. A polyvalent drier metal salt of the condensation product of a monomeric acyclic terpene having three double bonds per molecule and an α-, β-unsaturated organic acid anhydride having less than 7 carbon atoms per molecule.

5. A polyvalent drier metal salt of the condensation product of monomeric allo-ocimene and maleic anhydride.

6. A lead salt of the condensation product of monomeric allo-ocimene and maleic anhydride.

7. A cobalt salt of the condensation product of monomeric allo-ocimene and maleic anhydride.

8. A manganese salt of the condensation product of monomeric allo-ocimene and maleic anhydride.

9. The cobaltous salt of the condensation product of monomeric allo-ocimene and maleic anhydride.

10. The manganous salt of the condensation product of monomeric allo-ocimene and maleic anhydride.

11. A polyvalent metal salt of the condensation product of a material selected from the group consisting of the monomers and dimers of acyclic terpenes having three double bonds per molecule and a material selected from the group consisting of the $\alpha$-, $\beta$-unsaturated organic acids and acid anhydrides, which material contains less than 7 carbon atoms per molecule, the aforesaid condensation product having been partially esterified with a monohydric alcohol prior to salt formation.

12. A polyvalent metal salt of the condensation product of a material selected from the group consisting of the monomers and dimers of acyclic terpenes having three double bonds per molecule and a material selected from the group consisting of the $\alpha$-, $\beta$-unsaturated organic acids and acid anhydrides, which material contains less than 7 carbon atoms per molecule, the aforesaid condensation product having been partially esterified with a polyhydric alcohol prior to salt formation.

EMIL OTT.